United States Patent [19]
Fukuda et al.

[11] 3,741,097
[45] June 26, 1973

[54] SLIDE-TYPE FILM TAKE-UP MECHANISM
[75] Inventors: Susumu Fukuda; Sho Takahama, both of Nishimomiya, Japan
[73] Assignee: Fuji Photo Film Co., Ltd., Kanagawa, Japan
[22] Filed: Apr. 17, 1972
[21] Appl. No.: 244,689

[30] Foreign Application Priority Data
Apr. 15, 1971 Japan.............................. 45/24074

[52] U.S. Cl................. 95/31 AC, 95/31 FC, 242/71
[51] Int. Cl. ............................................ G03b 1/04
[58] Field of Search .................... 95/31 AC, 31 FC; 242/71

[56] References Cited
UNITED STATES PATENTS
| | | | |
|---|---|---|---|
| 2,833,189 | 5/1958 | Kaden | 95/31 AC |
| 3,646,867 | 3/1972 | Ono | 95/31 AC |
| 3,650,191 | 3/1972 | Nomura | 95/31 R |
| 3,673,941 | 7/1972 | Williams | 95/31 AC |

Primary Examiner—Samuel S. Matthews
Assistant Examiner—Michael D. Harris
Attorney—Richard C. Sughrue et al.

[57] ABSTRACT

A pinion is geared to an operating bar for film take-up and a locking pawl having a projection is fixed to the pinion for engagement with a step cam which is fixed to a film take-up shaft whereby sliding the operating bar in one direction will drive the film take-up shaft. A control lever having a projection is positioned to be rotated by engagement with the operating bar so that the projection thereof is positioned for engagement with the projection of the locking pawl to prevent a film take-up operation. A shutter lever is positioned to be rotated by engagement with the operating bar and then locked by a shutter release lever. The control lever may be reversely rotated to prevent engagement between the projection thereof and the projection of the locking pawl only by the rotation of the shutter lever by unlocking the shutter lever and the shutter release lever in a shutter release operation, so that the film will not be taken up even if the operating bar is slid into the camera body without a shutter release operation.

2 Claims, 9 Drawing Figures

3,741,097

SLIDE-TYPE FILM TAKE-UP MECHANISM

BACKGROUND OF THE INVENTION

This invention relates to a slide-type film take-up mechanism which performs a shutter setting operation as well as film take-up operations by the sliding movement of an operating bar or camera case.

A prior slide-type film take-up mechanism includes, as well known, a take-up shaft which takes film up by the length of a frame when an operating bar is reciprocated along the bottom of camera so that the external end thereof is moved in and out of camera body. The operating bar may also operate a feed sprocket which is driven by a gear wheel fixed to one end of the take-up shaft through reduction gears or the like. In this type of camera having such a mechanism, however, if the operating bar is pushed into camera, the film is taken up whether the shutter release is set or not. Therefore, there is a waste of film involved whenever the operating bar is inserted into the camera without first setting the shutter release. In order to avoid this fault, it is necessary to keep the camera in the state wherein the operating bar extends out of the camera body, that is, with the camera case open. Accordingly, this type of camera is inconvenient for portage and therefore, less practicable.

SUMMARY OF THE INVENTION

The present invention overcomes the above-described fault in the prior slide-type film take-up mechanism. It is an object of this invention to provide a slide-type film take up mechanism which will not waste film. A more concrete object of this invention is to provide a slide-type film take-up mechanism in which the film is taken up only when a shutter release is set, that is, film is not taken up even if an operating bar for the film take-up is pushed to slide into the camera body when the shutter release is not set. Accordingly, another object of this invention is to provide a camera convenient for portage and a really practical camera having a slide-type film take-up mechanism.

According to this invention, a pinion gear meshes with a rack on the side of an operating bar for film take-up. A locking pawl having a projection is fixed to the pinion through an arm and engages with a disk having a step cam which is fixed to a film take-up shaft so that upon sliding of the operating bar in one direction the film take-up shaft will be operated. A control lever having a projection is provided to be rotated by engagement with the operating bar so that the projection thereof is positioned to engage with the projection of the locking pawl for disabling a film take-up operation. The control lever may be reversely rotated only by the rotation of a shutter lever caused by a shutter release operation, so that the film is not taken up even if the operating bar is slid into camera body without a shutter release operation, so that the film is not taken up even if the operating bar is slid into camera body with a shutter release operation.

BRIEF DESCRIPTION OF THE DRAWINGS

FIGS. 4 A–F views showing the sequence of operation of the mechanism of FIG. 3, wherein

DESCRIPTION OF THE PREFERRED EMBODIMENT

Figure 3:
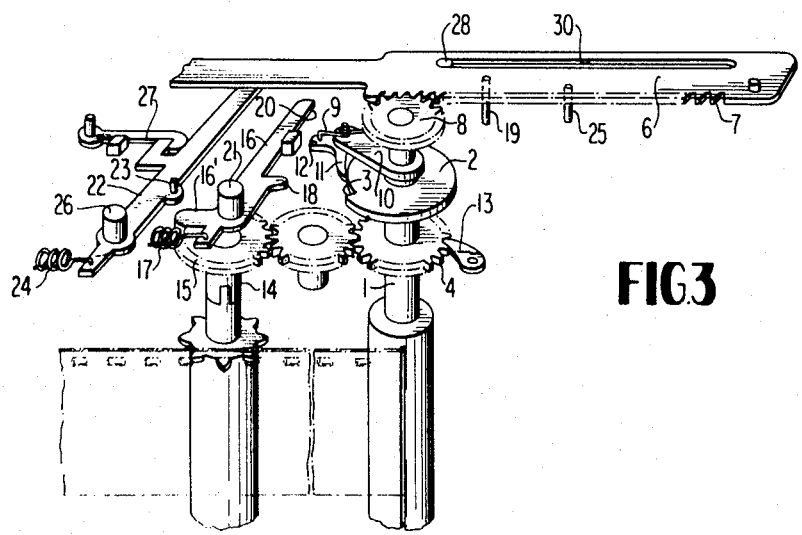
FIG. 3 is a developed bottom view of an embodiment of the slide-type film take-up mechanism according to this invention, which is adapted to be located in the bottom portion of the camera of FIG. 1.

Referring now to FIG. 3, a take-up shaft 1 is provided for rotation in the counter-clockwise direction. At one end portion of shaft 1 there are fixed a disk 2 with a step cam 3 formed on the periphery thereof and a gear wheel 4. A shaft 5 is provided which extends coaxially relative to the axis of the shaft 1. A pinion 8 is fixed to the shaft 5 and meshes with rack 7 formed on the side portion of an operating bar 6. An arm 10 is fixed to the shaft 5 and a locking pawl 11 with a projection 12 is pivotally mounted therein and biased by a spring 9 toward the axis of the shaft 5. A detent 13 is provided to permit the take-up shaft 1 to rotate when the pinion 8 is rotated in the counter-clockwise direction by the movement of the operating bar 6 and to prevent its rotation when the operating bar 6 is drawn out of the camera body.

Figure 2:
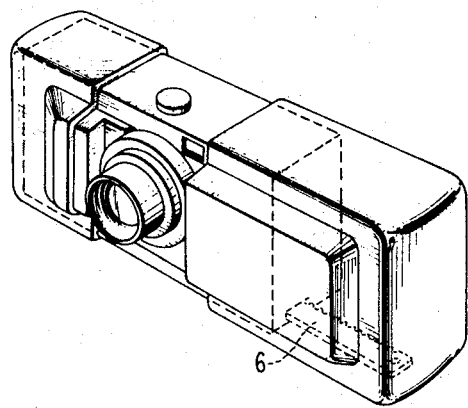
FIG. 2 is a perspective view of the camera of FIG. 1 which is opened into the position for taking a photograph.

As is apparent from the drawing, the take-up shaft 1 is rotated in accordance with the engagement between the locking pawl 11 pivoted to the arm 10 and the step cam 3 of the disk 2. The operating bar 6 is reciprocated along the bottom of the camera body and the external end of bar 6 is adapted to extend beyond the camera body as shown in FIG. 2.

A sprocket shaft 14 is provided so that the revolution ratio between a gear wheel 15 fixed thereto and the gear wheel 4 fixed to the take-up shaft 1 is 1:1. Near the locking pawl 11 a control lever 16 is pivoted about a shaft 21 and is biased to be rotated in the clockwise direction by a spring 17. The lever 16 has a projection 18 engaging with the projection 12 of the locking pawl 11 and an arm portion 20 which strikes against a pin 25 fixed to the operating bar 6 just before finishing the take-up of the film.

The projection 18 of the control lever 16 is positioned in the trajectory of the projection 12 in shutter release operation and out of the trajectory in the shutter setting operation.

A shutter lever 22 is pivoted about a shaft 26 and has a pin 23 engageable with a lug 16′ of the control lever 16 and is premanently biased by a spring 24 to rotate in the clockwise direction. The shutter setting operation is carried out when a pin 19 fixed to the operating bar 6 rotates the shutter lever 22 about the shaft 26 in the counter-clockwise direction and a release lever 27 maintains the lever 22 in the shutter set position.

The operating bar 6 is guided along a guide slot 30 and stopped by a stopper pin 28 at a predetermined position.

Additionally, a reciprocating movement of the operating bar 6 provides the pinion 8 with a rotation of most than one revolution, that is, the film is taken up by the length of a frame in accordance with the rotation of the pinion 8 by most than one revolution.

The operation of the above-described film take-up mechanism will be made apparent in the following description with reference to FIGS. 4A-4F.

Figure 1:
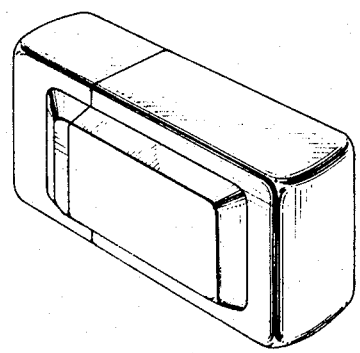
FIG. 1 is a perspective view of an example of a camera having a slide-type film take-up mechanism.

When the camera is closed within the camera case by moving the case from the state shown in FIG. 2 to the state of FIG. 1, the operating bar 6 is pushed into the camera body. Accordingly, the pinion 8 engaged with the rack 7 is rotated in the counter-clockwise direction and the shutter lever 22 is also rotated by the setting pin 19 in the same direction so as to result in the position of FIG. 4A.

Figure 4A:
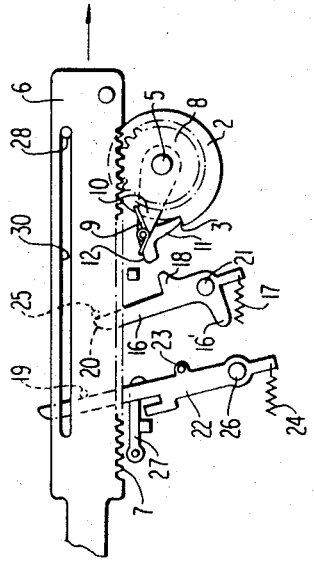
FIG. 4A illustrates the setting of the shutter, FIG. 4B the clicking of the shutter, FIG. 4C, the taking up of the film, FIG. 4D the position just before finishing the take-up of the film, FIG. 4E the position just before taking a photograph, and FIG. 4F the pushing of the operating bar into the camera body while maintaining the position before taking a photograph.
Figure 4B:
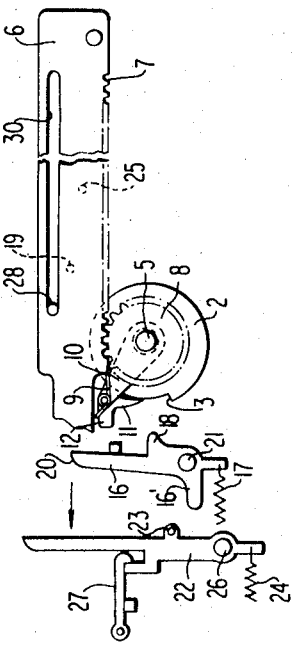
Figure 4C:
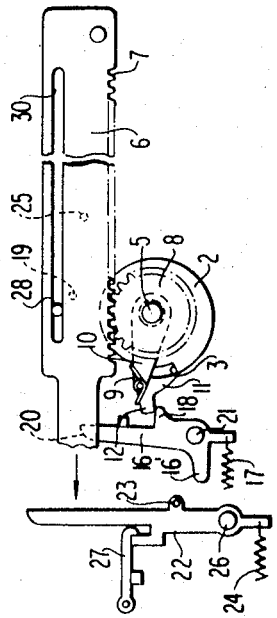
Figure 4D:
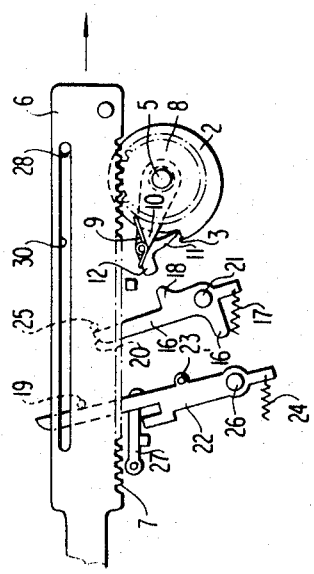
Figure 4E:
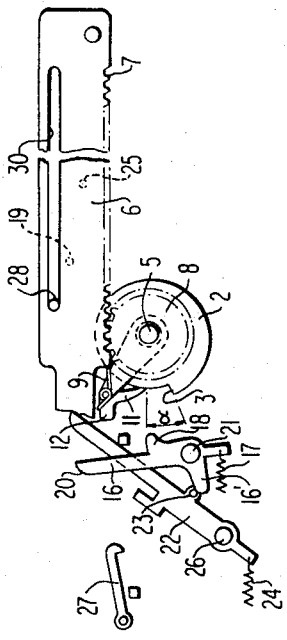
Figure 4F:
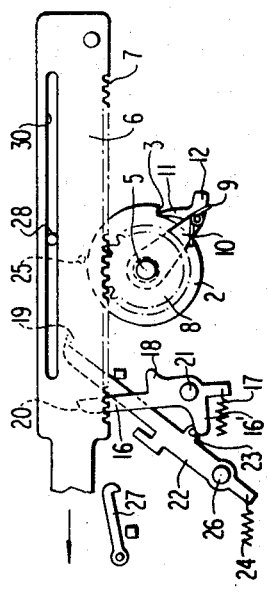

To take a photograph, the operating bar 6 is drawn out to the position of FIG. 4E, wherein the shutter lever 22 is locked by the release lever 27 to maintain the shutter set position.

Next, in the shutter release operation, the shutter lever 22 is disengaged from the release lever 27 by conventional means and rotated in the clockwise direction under the biasing of the spring 24, and simultaneously the control lever 16 is rotated in the counter-clockwise direction by the pin 23 so that the projection 18 thereof is positioned out of the trajectory of the projection 12 of the locking pawl 11, as viewed in FIG. 4B.

In this state, if the operating bar 6 is pushed into the camera body, the pinion 8 is rotated through the rack 7, the end of the locking pawl 11 engages with the step cam 3 of the disk 2 and the take-up shaft 1 is rotated according to the rotation of the pinion 8 in the counter-clockwise direction. Thus, the sprocket on shaft 14 is rotated through the gear wheels 4, 29 and 15 so as to transport the film, as viewed in FIG. 4C.

Simultaneously with film take-up, the setting pin 19 fixed to the operating bar 6 strikes against the shutter lever 22 to rotate it in the counter-clockwise direction into engagement with the release lever 27 to complete the shutter setting operation as viewed in FIG. 4D.

Then, drawing the operating bar 6 out of the camera body, the pinion 8 is rotated in the clockwise direction through the rack 7, so that the end of the locking pawl 11 moves along the periphery of the disk 2 by more than one revolution and the projection 18 of the control lever 16 is moved to be positioned within the trajectory of the projection 12 of the locking pawl 11, as viewed in FIG. 4E.

In this state, if the operating bar 6 is pushed into the camera body without a prior shutter release operation, the projection 12 of the locking pawl 11 will strike against the projection 18 of the control lever 16, whereby, the locking pawl 11 will be rotated in the clockwise direction against the biasing of the spring 9 and the end of the locking pawl 11 will jump over the step cam 3 of the disk 2 so that the disk 2 will not be rotated and accordingly, the take-up shaft 1 and the sprocket shaft 14 will not be rotated.

As described above, the film is taken up by the length of a frame in accordance with the sliding of the operating bar 6 only in the case wherein the shutter has been clicked while the shutter lever 22 is pushed by the setting pin 19 so as to set the shutter. When the operating bar 6 is drawn out of the camera body in order to click the shutter again, only the control lever 16 is rotated in the clockwise direction while maintaining the shutter set and the projection 18 thereof is brought to be positioned within the trajectory of the projection 12 of the locking pawl 11. Accordingly, even if the operating bar 6 is moved out of this position, the film will not be taken up.

In the film take-up operation, the projection 18 of the control lever 16 is removed out of the trajectory of the projection 12 so that the disk 2 is smoothly rotated by one revolution. During the further rotation of the disk 1 by x revolution, however, the engagement of the end of the locking pawl 11 with the step cam 3 of the disk 2 becomes unstable because the setting pin 19 pushes the shutter lever 22 to permit the rotation of the control lever 16 in the clockwise direction under the biasing of the spring 17 whereby the edge portion of the projection 18 will get in the trajectory of the projection 12. In order to avoid this, the pin 25 fixed to the operating bar 6 is provided to strike against the arm portion 20 of the control lever 16, just before the projection 18 engages with the projection 12 to rotate the control lever 16 in the counter-clockwise direction so that the projection 18 is removed out of the trajectory of the projection 12.

As apparent from the above description, according to this invention, the film take-up operation is carried out by the slide of the operating bar only in the case wherein the shutter has been clicked and the film is not taken up, even if the operating bar is moved, in the case wherein the shutter has not been clicked, so that it will be possible to avoid the waste of film which is a grave fault in this type of prior camera and further to provide the convenience for portage and the great practicability of this sort of camera because it is possible to stow the operating bar in the camera body whether the shutter release is set or not.

What is claimed is:

1. A slide-type take-up mechanism for a camera comprising:

a sliding operating bar which is externally operable of said camera, a rack means on said bar, a first shaft having a pinion mounted thereon engaged with said rack means for rotation upon sliding of said operating bar, arm means secured to said first shaft, a locking pawl pivotably mounted on said arm means and having a projection thereon, a take-up shaft, a disk having a step cam on the periphery thereof, fixed coaxially on said take-up shaft for rotation, means biasing said pawl against said disk for engagement with said step cam, a first pivot means, a shutter lever pivotably mounted on said first pivot means for setting a shutter, said lever being positioned for rotation by engagement with said operating bar, second pivot means, a control lever pivotably mounted on said second pivot means, said control lever having a projection at one end thereof for thereof for engagement with said projection of said locking pawl, means biasing said lever to rotate in the clockwise direction, said control lever being positioned so that said projection thereof is disposed in the trajectory of said projection of said locking pawl when said shutter lever is in a shutter set position and is disposed out of said trajectory when said shutter lever is in a shutter release position whereby the take-up of film upon sliding of said operating bar will occur only when said shutter lever is in the shutter release state.

2. A slide-type film take-up mechanism as set forth in claim 1 further comprising sprocket means for engagement with the film in the camera to advance the film and gear means connecting said sprocket means to take-up shaft whereby the sprocket means is rotated upon rotation of said take-up shaft.

* * * * *